US006249288B1

(12) United States Patent
Campbell

(10) Patent No.: US 6,249,288 B1
(45) Date of Patent: Jun. 19, 2001

(54) MULTI THREAD DISPLAY CONTROLLER

(75) Inventor: Paul W. Campbell, Oakland, CA (US)

(73) Assignee: ATI International SRL, Christ Church (BB)

( * ) Notice: Subject to any disclaimer, the term of this patent is extended or adjusted under 35 U.S.C. 154(b) by 0 days.

(21) Appl. No.: 09/211,692

(22) Filed: Dec. 14, 1998

(51) Int. Cl.[7] .............................. G06F 3/00; G06F 15/62

(52) U.S. Cl. .......................... 345/435; 345/113; 345/502; 345/505; 709/100

(58) Field of Search .................................... 345/326, 334, 345/339, 433, 435, 505, 113, 114, 1.2, 502, 356; 709/100, 101, 102, 103, 107, 147, 314, 315, 247; 348/394, 403, 407; 382/236, 238

(56) References Cited

U.S. PATENT DOCUMENTS 5,313,574 * 5/1994 Beethe ................................ 345/356
5,313,575 * 5/1994 Beethe ................................ 345/356
5,345,588 * 9/1994 Greenwood .......................... 395/650
5,561,811 * 10/1996 Bier ...................................... 345/326
5,828,848 * 10/1998 MacCormack ....................... 709/247
5,953,530 * 9/1999 Rishi .................................... 395/704
5,964,843 * 10/1999 Eisler .................................. 709/300
6,005,575 * 12/1999 Colleran .............................. 345/342
6,049,390 * 4/2000 Notredame .......................... 358/1.15

* cited by examiner

*Primary Examiner*—Matthew Luu
*Assistant Examiner*—Wesner Sajous
(74) *Attorney, Agent, or Firm*—Skjerven Morrill MacPherson LLP; Edward C. Kwok; Carmen C. Cook

(57) ABSTRACT

A display controller in a graphics display system executes a primitive for displaying video images including multiple overlays. The primitive improves latency tolerance of the display controller and ensures seamless transitions between each frame of video images. The primitive of the present invention is executed on a display controller including a display processor. The primitive enables the display processor to process multiple control threads independently of each other. The threads execute a program to generate display signals for a frame of video image. Each of the threads executes a switch instruction when it completes processing of pixel data. The switch instruction causes the thread to determine if it is the last thread to be processed. When a thread is not the last thread, the thread is set to an inactive state. When a thread is the last thread, the primitive reactivates the multiple control threads to process pixel data for the next frame video image. The threads may execute the same program if the video image has not changed or the threads may execute a new program if the video image has changed.

10 Claims, 4 Drawing Sheets

MULTI THREAD DISPLAY CONTROLLER

BACKGROUND OF THE INVENTION

1. Field of the Invention

The invention generally relates to computer display systems; and in particular, the present invention relates to a display controller supporting multiple overlays on a computer display.

2. Background of the Invention

A graphics display system of a personal computer must support a complex video display including multiple windows of text, graphical data and movie images. FIG. 1 is a block diagram of a typical graphics display system 100. System 100 includes display controller 101, system processor 102 and memory interface 103, all communicating over a system bus 106. System 100 further includes frame buffer memory 104 which is depicted here as including frame buffers 104*a*, 104*b*, and 104*c* and coupled to system bus 106 through memory interface 103. Frame buffer memory 104 typically has the capacity to store pixel data for at least one frame of a video display image. Video images are generally represented as sequences of frames where each frame is a matrix of pixels that vary in color and intensity according to the image displayed.

Display controller 101 and system processor 102 access frame buffer memory 104 via system bus 106. System processor 102 stores video data, or pixel data, for each frame of video image in frame buffer memory 104. Display controller 101 retrieves the stored video data and processes the data to generate graphics commands and data for driving a computer display 105. Graphics display system 100 is intended to be representative of those used in conventional general purpose personal computers and elements of system 100 are illustrative of those found in most personal computers.

Computer display 105 is a raster display monitor and display video images based on graphics commands and data generated by display controller 101. Display 105 can be any cathode ray tube (CRT) monitor or raster display monitor. Display 105 can also be any liquid crystal display (LCD) monitor. Display 105 displays a screen of image by scanning each line of pixel data horizontally, starting from the upper-left corner. After completing scanning a field of image (i.e. a full screen), the scan beams return to the upper-left corner to begin scanning and displaying the next field of pixel data. In general, the fields of pixel data are scanned on display 105 at a standardized display rate in the range of 60 to 85 frames/sec. Display controller 101 generates sync signals to align the display data with the scan beams. Typically, display controller 101 issues a vertical sync signal at the beginning of each display field (i.e. the upper-left corner of display 105) and a horizontal sync signal at the beginning of each scan line.

To compose a field of pixel data, display controller 101 accesses pixel data stored in frame buffers 104*a–c* for processing. When a video image includes multiple overlays, display controller 101 initiates a single control thread to process the pixel data for the video image. The control thread generates graphics commands and data, hereinafter cumulatively called display signals, for all the overlays within the frame of video image. Because only one control thread is used to process pixel data for all of the overlays, display controller 101 processes pixel data for each overlay in a lock-step fashion. Display controller 101 has poor memory latency tolerance because the processing of pixel data is limited by the slowest process required for a particular overlay. The latency in processing can cause the display image to suffer the effect of tearing or rolling.

It would be desirable to provide a display controller capable of processing pixel data at an improved rate so that the computer display can transition seamlessly between each frame of display images, thereby eliminating image tearing or rolling.

SUMMARY OF THE INVENTION

Accordingly, the present invention provides a primitive for execution on a display controller in a graphics display system which improves latency tolerance and ensures seamless transitions between each frame of display images. The primitive of the present invention is executed on a display controller including a display processor, a bank of FIFO memories, an optional graphics processing unit, and a digital-to-analog converter (DAC). The primitive enables the display processor to process a number of control threads independently of each other, thus improving the performance of the display processor when generating display signals for a display field. The primitive of the present invention is advantageously applied to a graphics display system to ensure seamless transitions of screen images.

The display processor executes the primitive of the present invention for displaying video images on a computer display where the video images include multiple overlays. The primitive includes the steps of (1) activating a starting thread, (2) activating multiple control threads to execute a first program, where the first program involves processing pixel data for a first frame of video image and each of the control threads generates display signals for each of the overlays in the first frame of video image, (3) processing the multiple control threads, (4) determining whether processing of a first one of the threads is a last thread to be processed, and (5) if processing of the first one of the threads is a last thread to be processed, reactivating the multiple control threads to process pixel data for a second frame of video image.

The above described method can also include the step of inactivating the first one of the threads if the first one of the threads is not the last thread to be processed.

In another embodiment, the step of reactivating the multiple control threads to process pixel data for a second frame of video image in the above described method can include the step of reactivating the threads to execute the first program when the second frame of video image is the same as the first frame of video image. Furthermore, the reactivating step can also include the step of reactivating the threads to execute a second program when the second frame of video image is different from the first frame of video image.

In yet another embodiment, the above described method can also include the steps of synchronizing the display signals and transmitting the display signals to the computer display.

The present invention is better understood upon consideration of the detailed description below and the accompanying drawings.

DETAILED DESCRIPTION OF THE PREFERRED EMBODIMENTS

Figure 2:
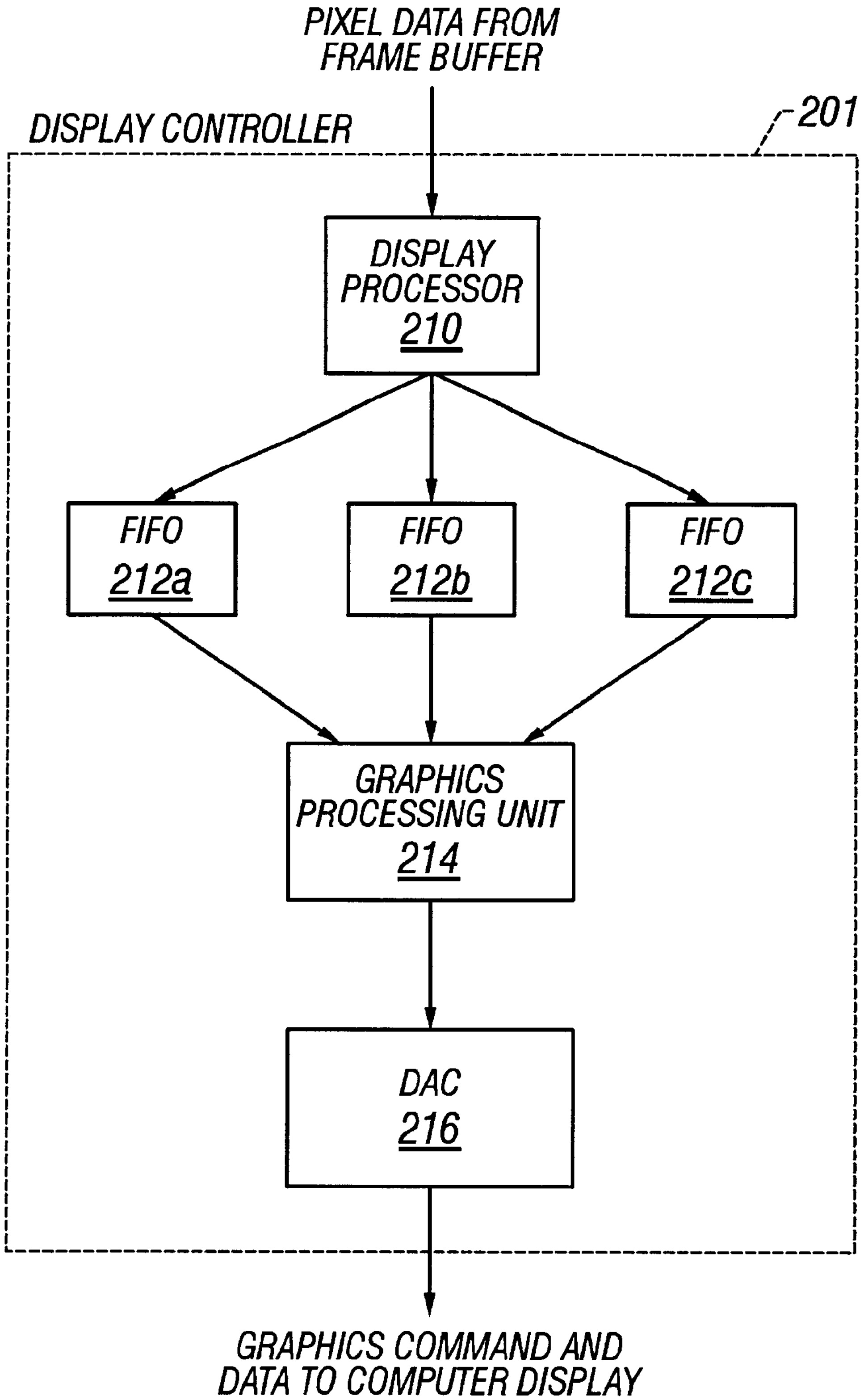
FIG. 2 is a block diagram of a display controller in accordance with one embodiment of the present invention.

In accordance with the present invention, a primitive for execution on a display controller in a graphics display system is provided which improves latency and ensures seamless transitions between each frame of display images. FIG. 2 is a block diagram of a display controller in accordance with one embodiment of the present invention. In FIG. 2, display controller 201 includes a display processor 210, a bank of first-in-first-out (FIFO) memory 212*a–c*, a graphics processing unit 214 and a digital-to-analog converter (DAC) 216. Display controller 201 of the present invention is particularly suitable for use in a graphics display system for displaying complex video images incorporating multiple overlays or windows.

In the present embodiment, display processor 210 is a multi-threaded processor, capable of executing multiple control threads, that is performing multiple concurrent activities. A control thread being executed on display processor 210 involves processing pixel data for a portion of the display field. Generally, a thread is related to processing pixel data for an overlay or a cursor of the video image. Each control thread generates display signals, including graphics commands and data, which are transmitted to FIFO Bank 212*a–c* for establishing one or more display queues. In FIG. 2, three display queues, represented by FIFO 212*a*, FIFO 212*b*, and FIFO 212*c* are illustrated. However, the FIFO configuration shown in FIG. 2 is illustrative only and is not intended to limit display controller 201 to a configuration of only three FIFO memory blocks. In fact, display processor 210 of the present embodiment can support any number of control threads and display controller 201 can be configured with any number of FIFO memory blocks depending on the complexity of the display image and the number of display queues required. In general, the display queues include a cursor queue and one or more overlay queues.

Figure 1:
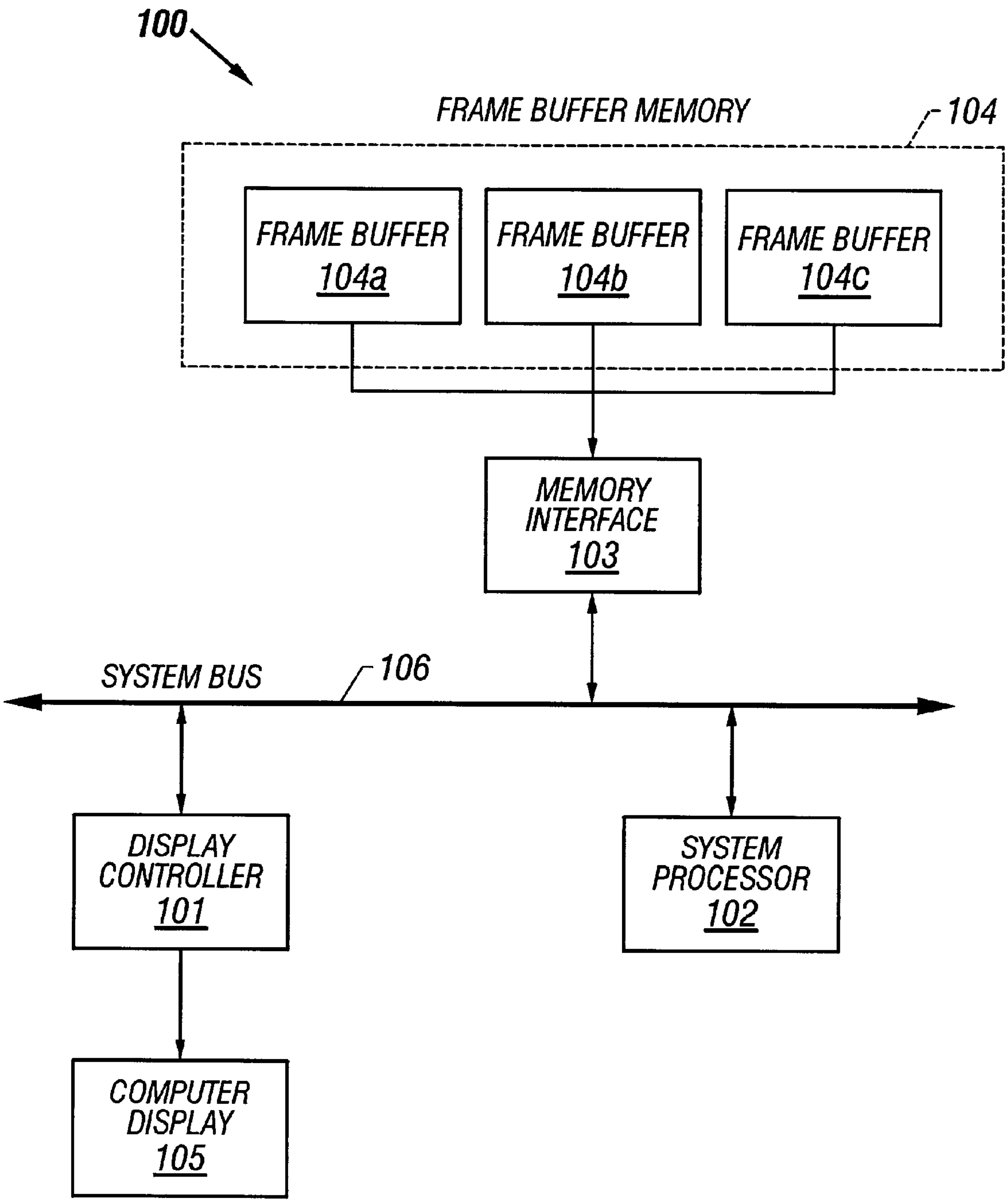
FIG. 1 is a block diagram of a conventional graphics display system.

Display processor 210 loads display signals into FIFO bank 212*a–c* asychronously. FIFO bank 212*a–c* synchronizes the display signals and serializes them into a single data stream. The single data stream is provided to graphics processing unit 214 for further video processing. Graphics processing unit 214 is an optional element of display controller 201. Graphics processing unit 214 may perform various graphics functions such as color space conversion or filtering. Graphics processing unit 214 then transmits the data stream to DAC 216. DAC 216 converts the data stream into analog signals and provides the analog signals to a computer display, such as display 105 of FIG. 1, for displaying the video images.

Figure 3:
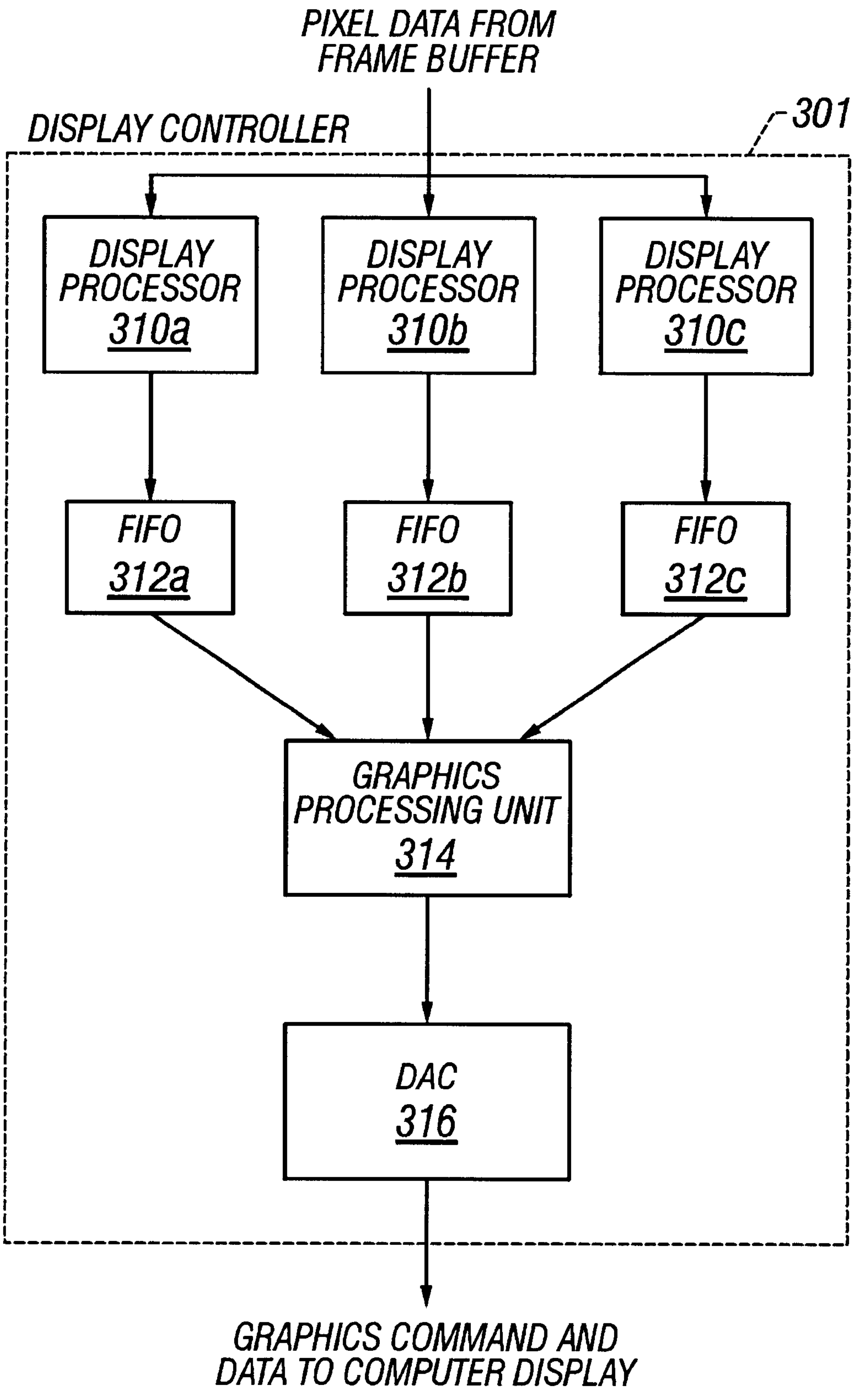
FIG. 3 is a block diagram of a display controller in accordance with another embodiment of the present invention.

Display processor 210 of the present invention can assume a variety of different configurations. Display processor 210 can comprise a single processor as depicted in FIG. 2 or a number of processors belonging to one or more computers as depicted in FIG. 3. FIG. 3 illustrates another embodiment of a display controller 301 on which the primitive of the present invention can be executed. In this embodiment, display controller 301 includes three separate display processors 310*a–c*. Each of display processors 310*a–c* feeds display signals into one of FIFO memory blocks 312*a–c*. The three-processor configuration shown in FIG. 3 is illustrative only. Display controller 301 can have any number of display processors and a corresponding number of FIFO memories. Furthermore, the separate processors of display controller 301 can belong to the same computer or to separate computers whereby display controller 301 receives pixel data from separate computers to be displayed on a single computer display monitor.

Figure 4:
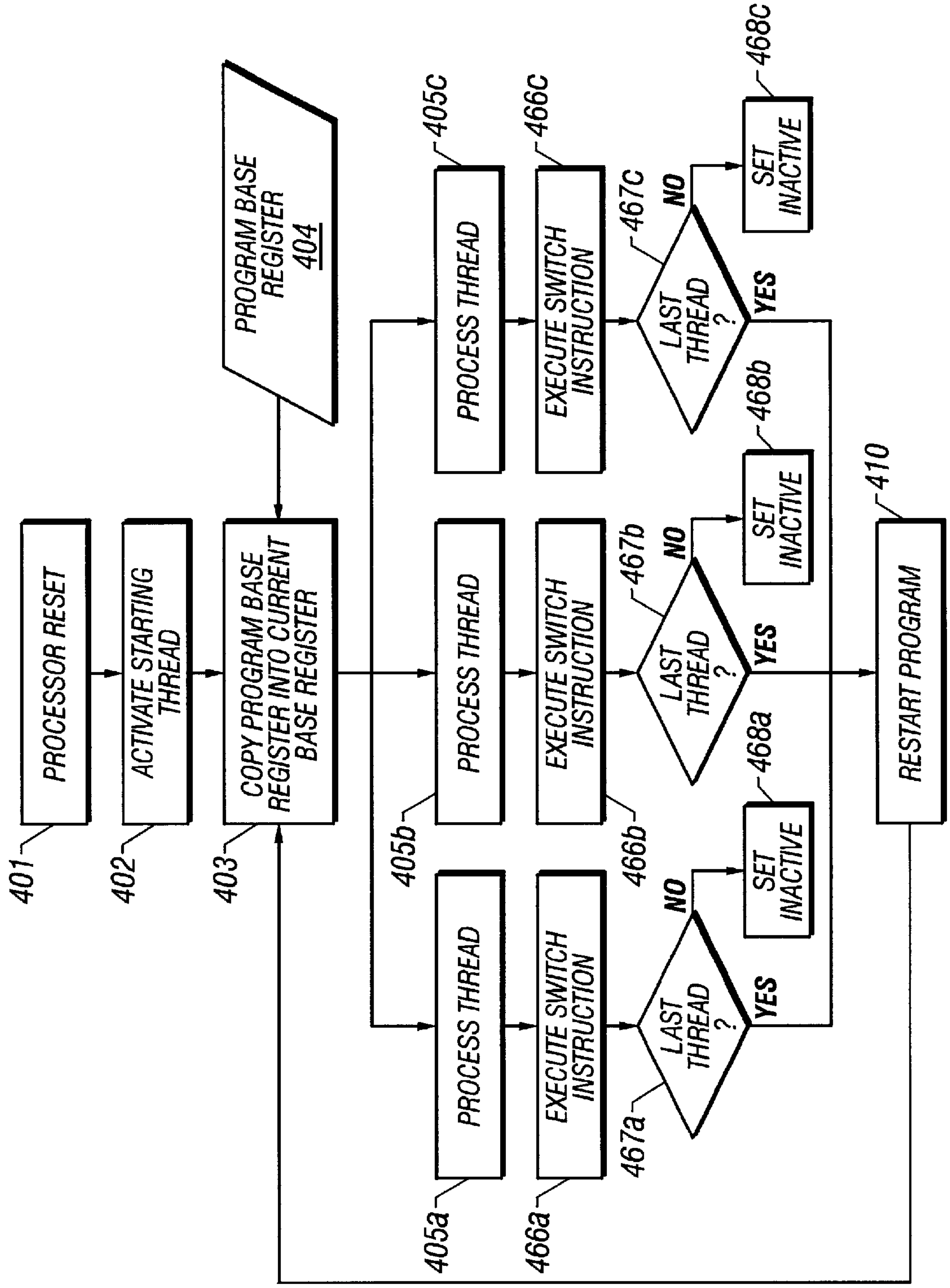
FIG. 4 is a flow diagram which illustrates the operation of the primitive in accordance with one embodiment of the present invention.

The primitive of the present invention enables display processor 210 to manage the multiple control threads more effectively. When executing the primitive of the present invention, display processor 210 keeps FIFO bank 212*a–c* as full as possible such that video images to be displayed on a computer screen can change seamlessly from one frame to another. FIG. 4 is a flow diagram which illustrates the operation of the primitive in accordance with one embodiment of the present invention. When initiated, display processor 210 is reset (step 401) and only one thread, the starting thread, is active (step 402). The starting thread causes display processor 210 to copy the content of a program base register 404 into a current base register (step 403). Display processor 210 uses the content of the current base register as the starting address of the first instruction executed after the processor reset step (step 401). Note that the copying step upon processor reset is automatic and no instruction from external software is required.

When a frame of pixel data is to be displayed, display controller 201 executes a program to process pixel data for the display field. The starting thread sets up a number of inactive threads, each of the inactive threads having starting addresses that are relative to the current base register. The starting thread then activates the control threads. The control threads process their tasks independently from each other (steps 405*a–c*). Each of the threads generates display signals corresponding to its respective portion of the display field. The processing of the threads are optimized because each thread works independently of the other. FIG. 4 illustrates the processing of three control threads (step 405*a–c*). FIG. 4 is illustrative only and is not intended to limit the present invention to a configuration of only three control threads. As described previously, the primitive of the present invention can support any number of control threads being executed on display processor 210.

The primitive of the present invention further includes a switch instruction. As each control thread completes processing (e.g. step 405*a*), the thread executes the switch instruction (step 466*a*). The control thread determines if it is the last thread that is still active (step 467*a*). If more than one thread is still processing, the switch instruction causes the thread to become inactive (step 468*a*). When the last thread completes processing and executes the switch instruction (for example, step 466*c*), the thread determines that it is the last active thread (step 467*c*), the switch instruction of the last active thread causes display processor to restart the program to process pixel data for the next display field (step 410). The switch instruction (step 466*a–c*) can be implemented in hardware or software.

While each of the control threads is being processed, the threads fill up the display queues in FIFO Bank 212*a–c*. FIFO Bank 212*a–c* synchronizes the display signals as the signals are being retrieved from FIFO Bank 212*a–c* according to methods known in the art. In one embodiment, synchronization of the display signals is carried out during the vertical sync time of the display scan. In other embodiments, synchronization can be carried out at any appropriate moments before the end of a screen scan. In the present embodiment, because the display signals are synchronized only once at the vertical sync time, the processing of the threads can take place while the computer display is scanning the video image of the previous display field, allowing sufficient time for the threads to process the display data for the next display field.

An important feature of the present invention is restart program step 410. Restart program step 410 causes display processor 210 to return to step 403. If the program base register 404 has not been changed, i.e., the screen image has not changed, display processor 210 restarts the current program. If the screen image has changed, such as when a window has been moved or resized, the program base register 404 is updated with new display data. Display processor 210 starts a new program by copying the content of program base register 404 to the current base register (step 403). Processing continues as previously described to generate the display signals for the new display field.

In accordance with the present invention, the processing of each program causes the threads to load display signals into the display queues in FIFO Bank 212*a–c*. At the start of a new program, display processor 210 causes the threads to continue to load the display queues in FIFO Bank 212*a–c* following the previously loaded data. Therefore, the display queues in FIFO Bank 212*a–c* are constantly being filled with display signals, allowing display controller 201 to stay ahead of the scan beam of the computer display. Display controller 201 can continuously supply display signals to the computer display, and the video image displayed can transition seamlessly between one display field and the next without tearing or rolling.

When executing the primitive of the present invention, display controller 201 achieves improved latency tolerance because synchronization only occurs once per display field during vertical retrace time. Under the primitive of the present invention, each of the control threads is being processed independently. The threads can be performing useful tasks while a slow thread is being processed and thus, the overall performance of display controller 201 is improved.

The above detailed description are provided to illustrate the specific embodiments of the present invention and is not intended to be limiting. Numerous modifications and variations within the scope of the present invention are possible. For example, in the present embodiment, the primitive of the present invention is embodied in hardware. However, one skilled in the art will appreciate that the primitive can also be implemented in software or a combination of both hardware and software. Furthermore, the present invention is described with respect to a non-interlaced scan format display, that is, each frame of video image comprises only one field of pixel data. However, one skilled in the art will appreciate that the present invention can be appropriately modified to display video images on a computer display using the interlaced scan format where two fields of pixel data are used to compose one frame of video image. The present invention is defined by the appended claims thereto.

I claim:

1. A method for displaying video images on a computer display, said video images comprising a plurality of overlays, said method comprising the steps of:

activating a starting thread;

activating a plurality of control threads to execute a first program whereby pixel data for a first frame of video image is processed, each of said control threads generating display signals for each of said overlays;

processing said plurality of control threads;

determining whether processing of a first one of said control threads is a last control thread to be processed; and if processing of said first one of said control threads is a last control thread to be processed, reactivating said plurality of control threads to process pixel data for a second frame of video image.

2. The method of claim 1, further comprising the step of inactivating said first one of said control threads if said first one of said control threads is not the last control thread to be processed.

3. The method of claim 1, wherein said step of reactivating said plurality of control threads to process pixel data for a second frame of video image comprises the step of:

reactivating said plurality of control threads to execute said first program when said second frame of video image is the same as said first frame of video image.

4. The method of claim 3, wherein said step of reactivating further comprises the step of:

reactivating said plurality of control threads to execute a second program when said second frame of video image is different from said first frame of video image.

5. The method of claim 1, wherein said step of reactivating said plurality of control threads to process pixel data for a second frame of video image comprises the step of:

reactivating said plurality of control threads to execute a second program when said second frame of video image is different from said first frame of video image.

6. The method of claim 1, wherein said step of processing said plurality of control threads comprises the steps of synchronizing said display signals and transmitting said display signals to said computer display.

7. The method of claim 1, wherein said step of activating a plurality of control threads to process pixel data for a first frame of video image comprises the step of:

copying the content of a program base register into a current base register.

8. The method of claim 7, wherein said step of reactivating said plurality of control threads to process pixel data for a second frame of video image comprises the steps of:

comparing the content of said program base register and said current base register; and reactivating said plurality of control threads to execute said first program when the content of said program base register is the same as the content of said current base register.

9. The method of claim 8, wherein the step of reactivating further comprises the step of:

reactivating said plurality of control threads to execute a second program when the content of said program base register is different from the content of said current base register.

10. The method of claim 7, wherein said step of reactivating said plurality of control threads to process pixel data for a second frame of video image comprises the steps of:

comparing the content of said program base register and said current base register; and reactivating said plurality of control threads to execute a second program when the content of said program base register is different from the content of said current base register.

* * * * *